United States Patent [19]

Kido et al.

[11] Patent Number: 5,384,518

[45] Date of Patent: Jan. 24, 1995

[54] POWER SOURCE DEVICE

[75] Inventors: Shojiro Kido; Toshiaki Nakamura; Takashi Kambara; Yoshitaka Taga; Haruo Nagase, all of Kadoma, Japan

[73] Assignee: Matsushita Electric Works, Ltd., Osaka, Japan

[21] Appl. No.: 257,141

[22] Filed: Jun. 9, 1994

[30] Foreign Application Priority Data

Jun. 10, 1993 [JP] Japan .................. 5-139659
Dec. 22, 1993 [JP] Japan .................. 5-325321

[51] Int. Cl.6 ............................. H05B 37/02
[52] U.S. Cl. .................. 315/225; 315/209 R; 315/119; 315/241 R; 315/106; 315/107; 315/DIG. 7
[58] Field of Search ............... 315/209 R, 225, 119, 315/241 R, 74, 91, 106, 107, DIG. 7

[56] References Cited

U.S. PATENT DOCUMENTS

| | | | |
|---|---|---|---|
| 4,247,803 | 1/1981 | Walz | 315/106 |
| 4,616,158 | 10/1986 | Krummel et al. | 315/225 |
| 5,138,235 | 8/1992 | Sun et al. | 315/209 R |
| 5,175,471 | 12/1992 | Stockinger et al. | 315/107 |
| 5,291,099 | 3/1994 | Gill et al. | 315/119 |

*Primary Examiner*—Robert J. Pascal
*Assistant Examiner*—Reginald A. Ratliff

[57] ABSTRACT

A power source device includes a voltage converting means to input side of which a DC voltage source is connected and to output side of which a capacitance element and a load circuit are connected, while a control circuit is connected to the voltage converting means and the load circuit, the latter circuit having a load impedance made lower upon starting of a load in the load circuit than that in stable lighting of the load, wherein such control constant as oscillation frequency and duty are made to be substantially constant at the time of the starting and stable lighting of the load, and a switching means in the voltage converting means is turned OFF when the capacitance element has a voltage below a predetermined value.

20 Claims, 16 Drawing Sheets

POWER SOURCE DEVICE

BACKGROUND OF THE INVENTION

This invention relates to a power source device for supplying power from a DC voltage source to a load circuit with a source voltage converted to a desired DC or AC voltage.

In this case, the load circuit includes such load as a high intensity discharge lamp, an incandescent lamp, a halogen lamp or the like, the impedance of which is made smaller immediately after initiation of the power supply, i.e., upon starting the load, than in the case of stable lighting or operation of the load.

DESCRIPTION OF RELATED ART

In the power source device for supplying to the load circuit the desired DC or AC voltage converted from the power of the DC voltage source, as will be readily appreciated, the efficiency of circuit operation can be improved and the power source device can be minimized in size when any loss occurring upon switching operation of a switching element contributive effectively to the above conversion is reduced as much as possible.

In U.S. Pat. No. 5,068,578, there is disclosed an arrangement in which, after boosting a DC voltage, a rectangular voltage is supplied through a low frequency inverter to the load. In European Patent No. 059,053, there is described a control arrangement, as an aspect of control of boosting means, for rendering an output voltage to be constant, so that any ripple can be reduced.

Further, U.S. Pat. No. 5,151,631 discloses a measure for applying a high frequency voltage to the load by means of a high frequency inverter after boosting a DC voltage.

Here, in an event where the load impedance in the relationship between those upon the starting and during the stable operation or lighting of such load as the high intensity discharge lamp or incandescent lamp is shown to be higher during the stable lighting than that upon the starting whereas, the supply power to a boosting means in the relationship between those upon the starting and during the stable lighting is shown to be larger upon the starting than that during the stable lighting, a current caused to flow to the switching element of the boosting means is necessarily increased upon the starting to be more than that during the stable lighting. In order to render the arrangement to have an output voltage shown to be low in the ripple even upon the starting by performing the same control operation as that during the stable lighting, it is required to employ a condenser of a large capacity as an output means and to change over a control switching frequency and an on-duty or the like between the starting and the stable lighting, so that there arise problems that the entire size of the power source device is increased, required control circuit is caused to be complicated and, in particular, a switching loss is also increased.

However, either one of the foregoing known arrangements including, in particular, U.S. Pat. No. 5,151,631 has been failing to eliminate the above problems.

SUMMARY OF THE INVENTION

Accordingly, the present invention has am object to overcome the above problems and thus to provide a power source device capable or remarkably improving the efficiency of circuit operation by reducing the switching loss at the voltage converting means, in particular, the switching means in the boosting means, and contributing to the realization of minimum size.

According to the present invention, the above object is established by means of a power source device in which a voltage converting means provided with a power controlling high frequency switching means for rendering a supply power larger at least upon starting a load than that during a stable operation of the load, is connected to a DC voltage source, a capacitance element is connected to output side of the voltage converting means, and a load circuit including the load is connected in parallel to the capacitance element and having a load impedance made lower upon the starting than that during the stable operation, characterized in that the high frequency switching means is controlled by a control means with a control constant made substantially constant at least immediately after the starting of the load and during the stable operation of the load, and turning the high frequency switching means OFF when the capacitance element is of a voltage below a predetermined value.

Other objects and advantages of the present invention should become clear as the following description of the invention advances as detailed with reference to preferred embodiments of the invention shown in accompanying drawings.

Figure 1A:
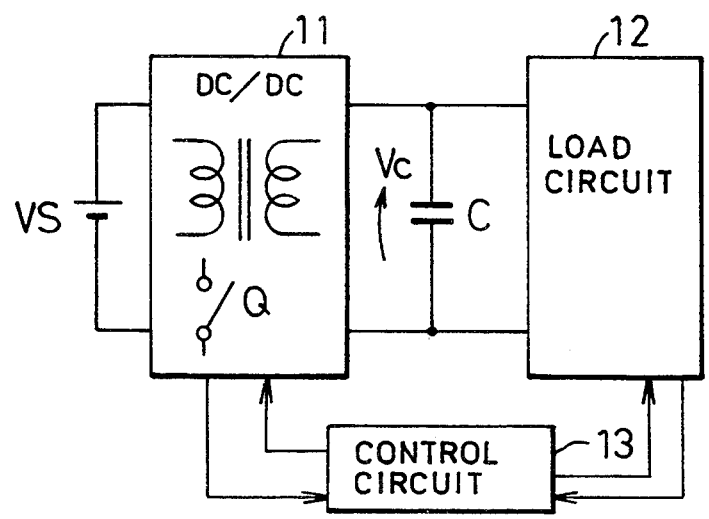
FIG. 1A shows in a block circuit diagram the power source device in an embodiment according to the present invention.

While the present invention shall now be described with reference to the various embodiments shown in the drawings, it should be appreciated that the intention is not to limit the invention only to such embodiments shown, but rather to include all alterations, modifications and equivalent arrangements possible within the scope of appended claims.

DETAILED DESCRIPTION OF THE PREFERRED EMBODIMENTS

Figure 1B:
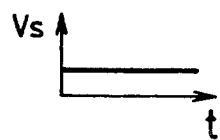
FIGS. 1B and 1C are wave-form diagrams of voltages at parts of the device shown in FIG. 1A.
Figure 1C:
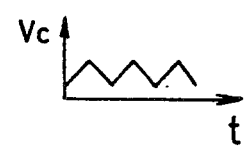

Referring here to FIG. 1A, the power source device in an embodiment according to the present invention includes such voltage converting means 11 as a DC/DC converter connected to a DC voltage source VS, and this voltage converting means 11 comprises a power-controlling high frequency switching means Q and functions to render a supply power to be larger upon starting a later described load than that during a stable operation of the load. To an output side of this voltage converting means 11, such capacitance element as a capacitor C is connected, and a load circuit 12 comprising the foregoing load is connected in parallel to the capacitance element so as to show a load impedance made to be lower upon the starting than that during the stable operation of the load. In this case, the arrangement is so made that such control constant as oscillation frequency and duty of primary coil side switching element upon the starting and the stable operation of the load are made to be substantially constant by the voltage converting means 11. Further, a control circuit 13 is connected to the voltage converting means 11 and the load circuit 12, and this control circuit 13 includes means for detecting when a voltage across the capacitance element C upon the starting is such pulsating voltage as shown in FIG. 1C in contrast to such source voltage Vs as in FIG. 1B of the DC voltage source VS, so that this detecting means will provide an output for turning OFF the switching means Q when the detected pulsating voltage shows to be below a predetermined value. In this instance, it should be appreciated that part or the whole of the control circuit 13 may be included in the voltage converting means 11 or in the load circuit 12, as occasion demands.

With this power source device of FIG. 1A, it is made possible to remarkably reduce any loss occurring upon switching operation at the switching means which performs a high frequency operation, whereby the operational efficiency of the load circuit is improved while simplifying the device arrangement, so that the arrangement can be effectively contributive to a minimization of the entire device. Here, it is preferable that the predetermined value for the pulsating voltage to be detected by the detecting means is set to be close to zero value.

Figure 2:
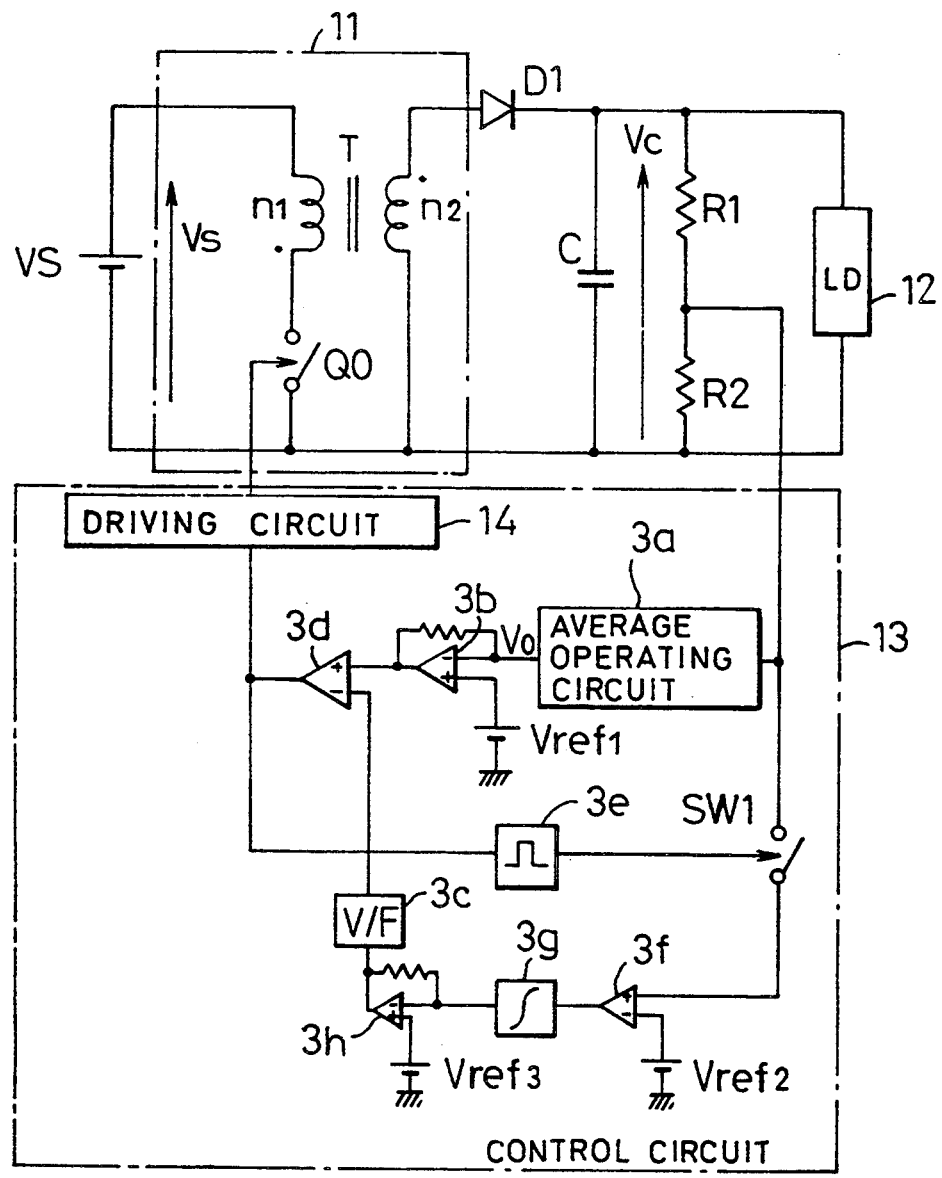
FIG. 2 is a more concrete circuit diagram of the device shown in FIG. 1A.

In FIG. 2, there is shown a more concrete circuit arrangement of the embodiment shown in FIG. 1A, in which the voltage converting means 11 connected to the DC voltage source VS includes a transformer T, to a primary winding n1 of which such switching means Q0 as MOSFET, preferably, is connected, while a secondary winding n2 of the transformer T is connected through a diode D1 as a rectifying means to the capacitor C as the capacitance element, the diode D1 performing a rectification in a direction of charging the capacitor C upon turning OFF of the switching means Q0. Further, across the capacitor C, the load circuit 12 including the load LD is connected with a series circuit of resistors R1 and R2 interposed as the detecting means, and a divided output of the pulsating voltage at the capacitor C by means of the resistors R1 and R2 is provided to the control circuit 13. For the capacitor C, one having a relatively large capacity and adapted to an aquisition of an output of constant voltage has been used conventionally, but in the present invention one having such a small capacity as below several $\mu F$ is employed without adaption to the constant voltage output, so that the pulsating voltage will be intentionally kept as it is to be utilized.

In the control circuit 13, the divided pulsating voltage from the resistors R1 and R2 as the detecting means is provided to an averaging circuit 3$a$, and an output voltage $V_o$ as an average divided-voltage value of the voltage $V_c$ of the capacitor C is provided to an error amplifier 3$b$, where a difference voltage of the output voltage $V_o$ of the averaging circuit 3$a$ and a reference voltage $V_{ref1}$ is operated, this difference voltage is compared at a comparator 3$d$ with a triangular wave output voltage from a V/F converter 3$c$, the switching means Q0 is driven through a driving circuit 14 by a comparison output of the comparator 3$d$, and the control is so made as to maintain the average voltage $V_o$ of the capacitor voltage $V_c$ at a predetermined voltage.

Referring more specifically to the above, the divided voltage by the resistors R1 and R2 is provided, through a switch element SW1 made ON by an output of one-shot multivibrator 3$e$ which generates the output for a predetermined period as triggered by an output rising of the comparator 3$d$, to another comparator 3$f$ to be compared with a further reference voltage $V_{ref2}$. An output of this comparator 3$f$ is integrated by an integrator 3$g$ and, thereafter, its difference from another reference voltage $V_{ref3}$ is taken at a further error amplifier 3$h$, which difference is provided to the V/F converter 3$c$. Here, the reference voltage $V_{ref2}$ is one for judging whether or not the voltage $V_c$ is substantially at zero state and, when the voltage $V_c$ is substantially zero the comparator 3$f$ provides an "H" output, while the reference voltage $V_{ref3}$ is to determine a voltage input to the V/F converter 3$c$ upon its starting, that is, an initial switching frequency of the switching elements Q0 is to be determined by the reference voltage $V_{ref3}$.

In this case, the control system is arranged for realizing an operation of calming the voltage $V_c$ down as balanced in the pulsating state substantially to be zero, and the desired operation can be executed. At this time, the intended operation of the present invention is made realizable by varying the switching frequency of the switching element Q0. While the description has been made with the capacitor voltage $V_c$ to be at the predetermined voltage, it is also possible to employ such other aspect of the control that an average value of output power is obtained with output current detected, so as to use this average value as the predetermined power. Further, the arrangement is possible to attain the intended operation of the present invention without carrying out the detection.

Figure 3:
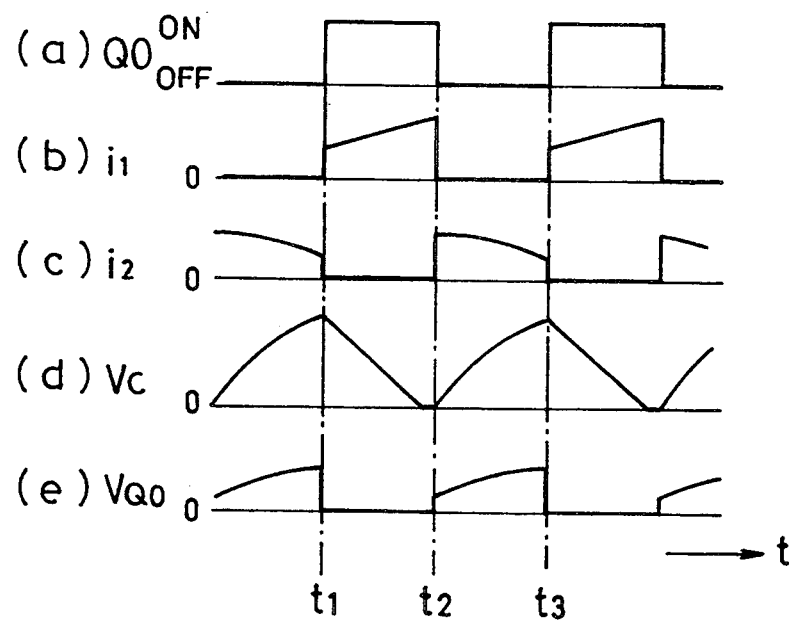
FIG. 3 shows wave-forms (a) to (e) at respective parts in the circuit of FIG. 2.

Now, as the switching element Q0 turns ON as in FIG. 3(a), there flows such a current $i_1$ as in FIG. 3(b) through the primary winding n1 of the transformer T in the voltage converting means 11, accompanying which a magnetic energy is accumulated in the transformer T. In a period t1-t2, as in FIG. 3(c), no current $i_2$ is made to flow through the secondary winding n2 of the transformer T, so that only an energy from the capacitor C is discharged to the load circuit 12, and the output voltage $V_c$ is lowered as shown in FIG. 3(d). While in the present embodiment there is shown a case where the voltage is lowered to zero potential, it is also possible to employ an aspect in which the voltage is not lowered to be zero.

As the switching element Q0 is turned OFF at the time t2, next, the energy accumulated in the transformer T is discharged as the current $i_2$ in FIG. 3(d), in response to which the voltage $V_c$ at the capacitor C starts rising as in FIG. 3(d). At the time t3, next, the switching element Q0 is turned ON again, and thereafter this operation is repeated. In this case, the voltage $V_{Q0}$ applied to the switching element Q0 is of such wave-form as shown in FIG. 3(e) which shows a low level at the time t3 but rises gradually as the capacitor C is charged and the voltage $V_c$ rises and, when the switching element Q0 is turned ON at the time t3, shows to be substantially zero again.

Referring more concretely to the above, the voltage $V_{Q0}$ upon turning OFF of the switching element Q0 will be substantially $V_s+(N1/N2) \cdot V_c$ where the primary winding of the transformer T is of a turn number N1 and its secondary winding is of a turn number N2. That is, provided that the voltage $V_c$ of the capacitor C at the time t2 is zero or at a low value, then the voltage $V_{Q0}$ of the switching element Q0 will be also a low value around the voltage $V_s$ of the DC voltage source $V_s$, so that the switching loss occurring at the time t2, that is, upon turning OFF of the switching element Q0 can be effectively lowered. Accordingly, the operation efficiency of the employed circuit can be remarkably improved and the device as a whole can be sufficiently minimized in size.

While in the above a working aspect suitable for an event where the current flows continuously to the transformer T, that is, the current $i_1$ or $i_2$ is always flowing has been described, the same effect can be established even by means of an arrangement in which the current flowing through the transformer T is discontinuous. Further, while it has been described that MOSFET is used as the switching element Q0, such other switching element as other transistor, IGBI or the like may also be used. Further, it is also possible to employ an arrangement in which the voltage $V_c$ of the capacitor C including the pulsating voltage is provided to the detecting means so that, when this voltage $V_c$ is below a predetermined value, the switching element will be turned OFF in accordance with a detection signal provided out of the detecting means. In addition, still another arrangement may also be employed such that the timing of turning OFF upon starting of the switching element Q0 in the DC/DC converter is rendered to be around zero of the voltage $V_c$ by properly setting the switching frequency f and ON time Ton of the DC/DC converter, turn ratio of the transformer T or the capacity of the capacitor C.

Figure 4:
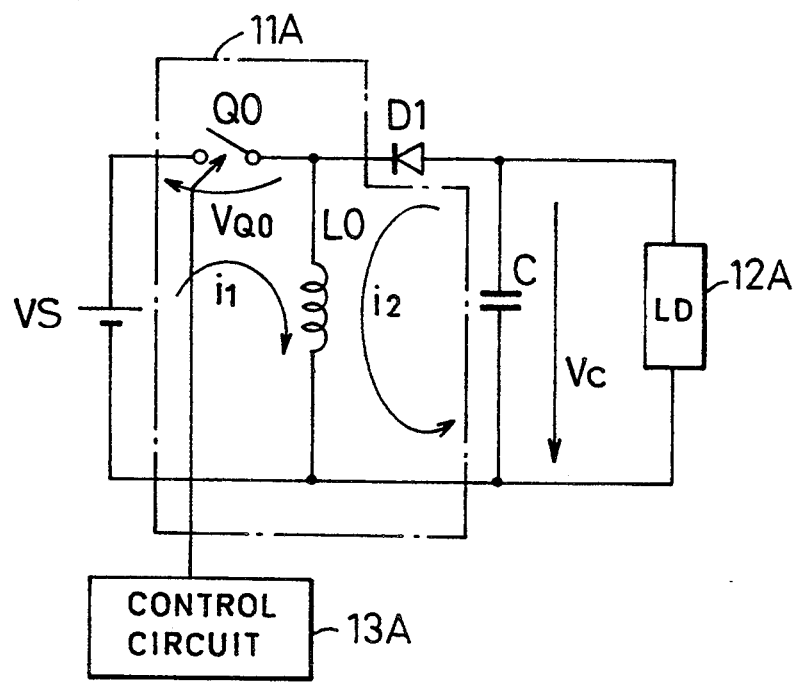
FIGS. 4 and 5 show in schematic circuit diagrams further embodiments of the device according to the present invention.

In FIG. 4, there is shown another embodiment of the device according to the present invention, in which the voltage converting means 11A is arranged by a DC/DC converter which comprises a voltage boosting and dropping chopper. Further, an inductor L0 is connected as an inductance component through the switching means Q0 to the DC voltage source VS' and the capacitor C is connected to the inductor L0 through the diode D1 which is disposed to be reverse directional with respect to the current from the DC voltage source VS. In this case, the voltage $V_{Q0}$ of the switching element Q0 at the time when the current $i_2$ flowing to the inductor L0 upon turning OFF of the switching element Q0 does not become zero can be represented substantially by $V_s+V_c$, upon which wave-forms at the respective parts of the circuit in the present embodiment will be the same as those in FIG. 3.

Figure 5:
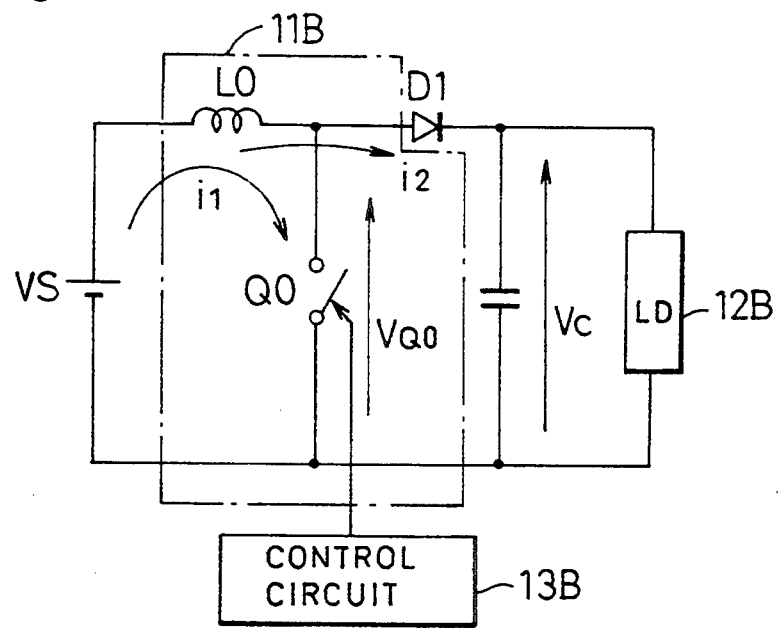

In FIG. 5, there is shown still another embodiment of the present invention, in which the voltage converting means 11B is constituted by the DC/DC converter comprising a voltage boosting chopper, and the switching element Q0 is connected through the inductor L0 as an impedance element to the DC voltage source VS, and through the diode D1 disposed to be in normal direction with respect to the current from the DC voltage source VS to the inductor L0 to the capacitor C. Now, in a period in which the switching element Q0 connected through the inductor L0 to the DC voltage source VS is made ON during t1-t2 (or t3-t4) as shown in FIG. 6(a), the current $i_1$ as in FIG. 6(b) is caused to flow through the inductor L0 to have a magnetic energy accumulated in the inductor, the thus accumulated energy is discharged from the inductor L0 through the diode D1 upon turning OFF of the switching element Q0, and the current $i_2$ as in FIG. 6(c) is made to flow through the capacitor C to charge the same.

Figure 6:
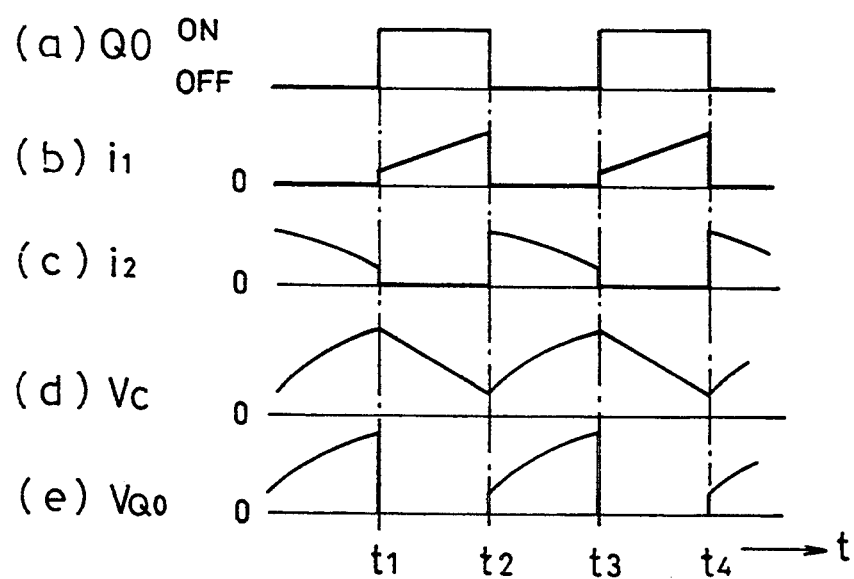
FIG. 6 shows wave-form (a) to (e) at parts in the circuit of FIG. 5.

Here, the above capacitor C discharges its charge upon turning ON of the switching element Q0 as in FIG. 6(d) to have the voltage $V_c$ lowered, but the capacitor C is charged upon turning OFF of the switching element Q0 to have the voltage $V_c$ raised, so that the voltage $V_c$ of the capacitor C can be positively made to pulsate. Further, the voltage $V_{Q0}$ of the switching element Q0 is to be lowered to be substantially equal to the voltage $V_c$ of the capacitor C.

Figure 7:
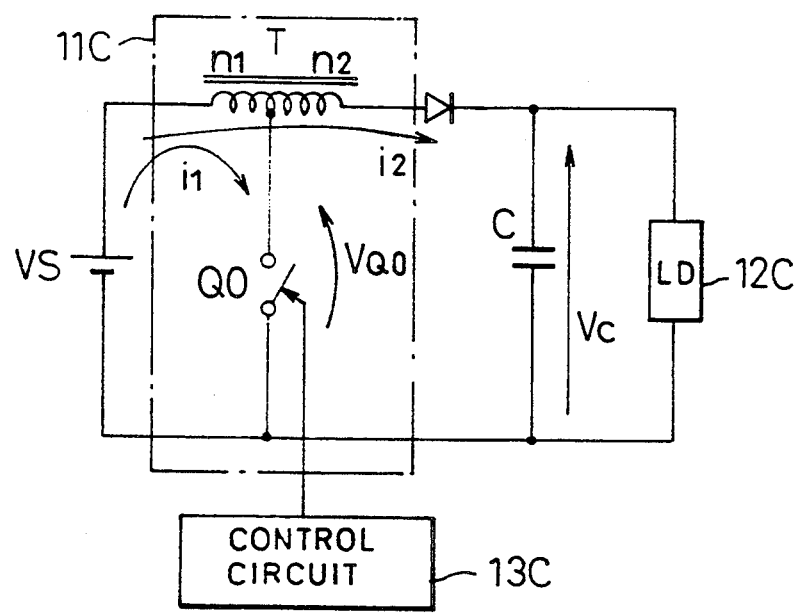
FIGS. 7 to 10 are circuit diagrams showing still further embodiments of the present invention.

In FIG. 7, there is shown still another embodiment of the present invention, in which the transformer T in the embodiments of FIG. 1 and FIG. 2 is formed in an autotransformer so that, in the present case, the voltage $V_{Q0}$ upon turning OFF of the switching element Q0 in the voltage converting means 11C will be substantially equal to $$V_s+N1/(N1+N2) \cdot (V_c-V_s)=N2/(N1+N2) \cdot V_s+N1/(N1+N2) \cdot V_c$$

and it is made possible to restrain the value of the voltage $V_{Q0}$ to be low by means of the turn ratio of the turn numbers N1 and N2 of the primary and secondary windings forming the autotransformer T.

Figure 8:
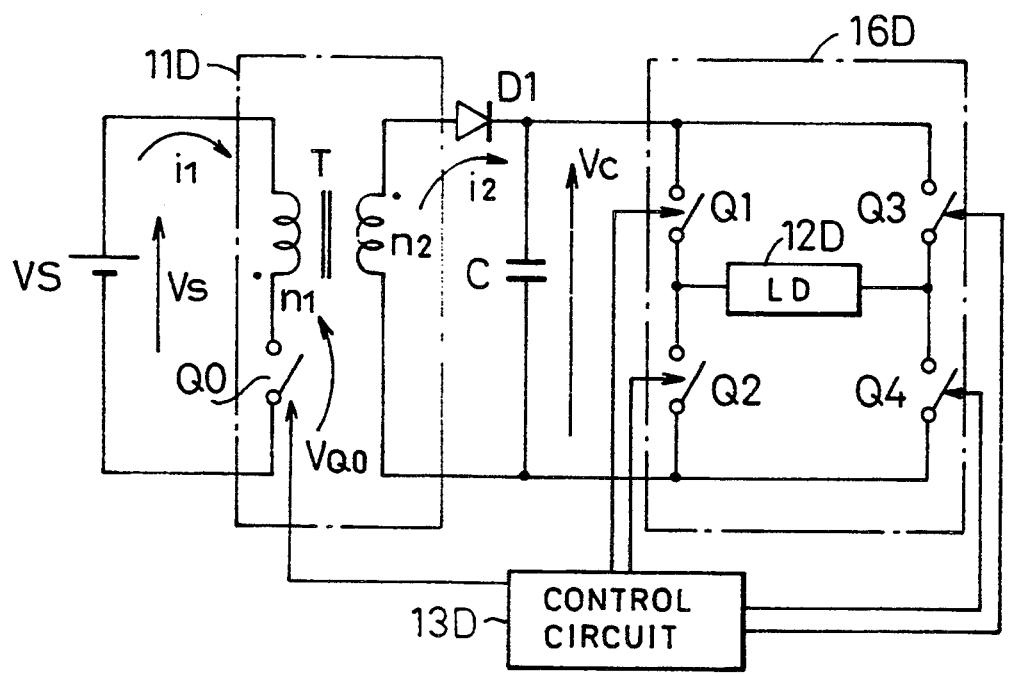

In FIG. 8, there is shown another embodiment of the present invention, in which, in contrast to the embodiment of FIG. 1 and FIG. 2, there is provided an inverter means 16D for supplying the output voltage of the voltage converting means 11D to the load circuit 12D while alternating the polarity of the voltage. In this case, the inverter means 16D is inserted between the capacitor C connected through the diode D1 in forward direction to the secondary winding of the transformer T and the load circuit 12D. In the present embodiment, too, the voltage $V_c$ across the capacitor C can be positively made to pulsate, and the switching elements Q1, Q4 and Q3, Q2 in pairs in full-bridge type of the inverter means 16D are alternately turned ON and OFF at a low frequency by the driving signals from the control circuit 13D, so that an AC voltage will be supplied to the load circuit 12D.

Figure 9:
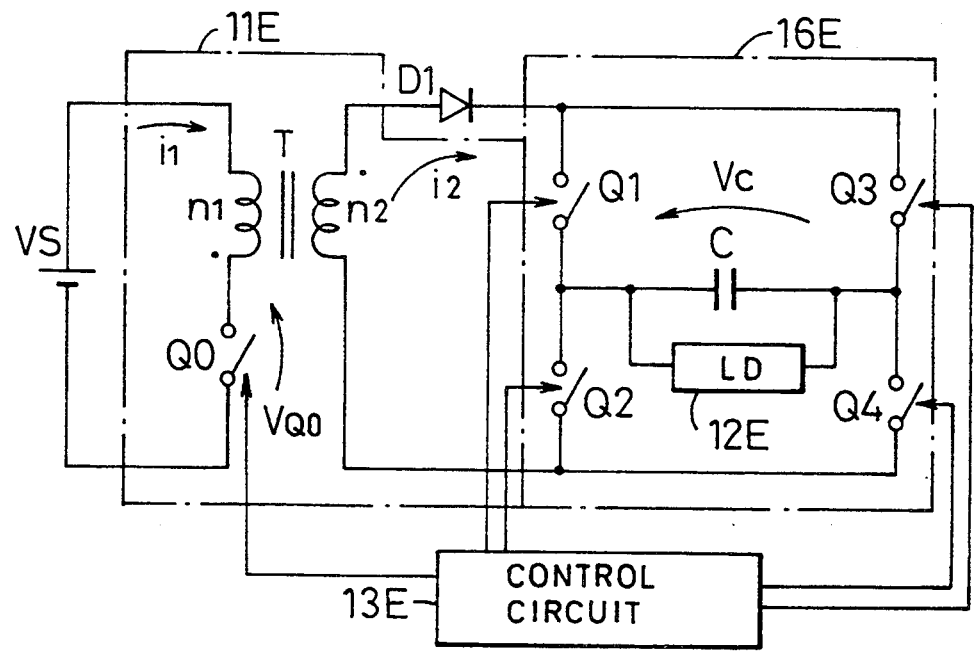

In a further embodiment shown in FIG. 9, in contrast to the embodiment of FIG. 8, the inverter means 16E is connected directly through the diode D1 to the secondary winding n2 of the transformer T in the voltage converting means 11E, and the capacitor C is connected to be in parallel to the load circuit 12E within the inverter means 16E. In the present embodiment, too, the switching elements Q1, Q4 and Q3, Q2 in pairs of the inverter means 16E are alternately turned ON and OFF at a low frequency, and an AC voltage can be supplied to the load circuit 12E.

Figure 10:
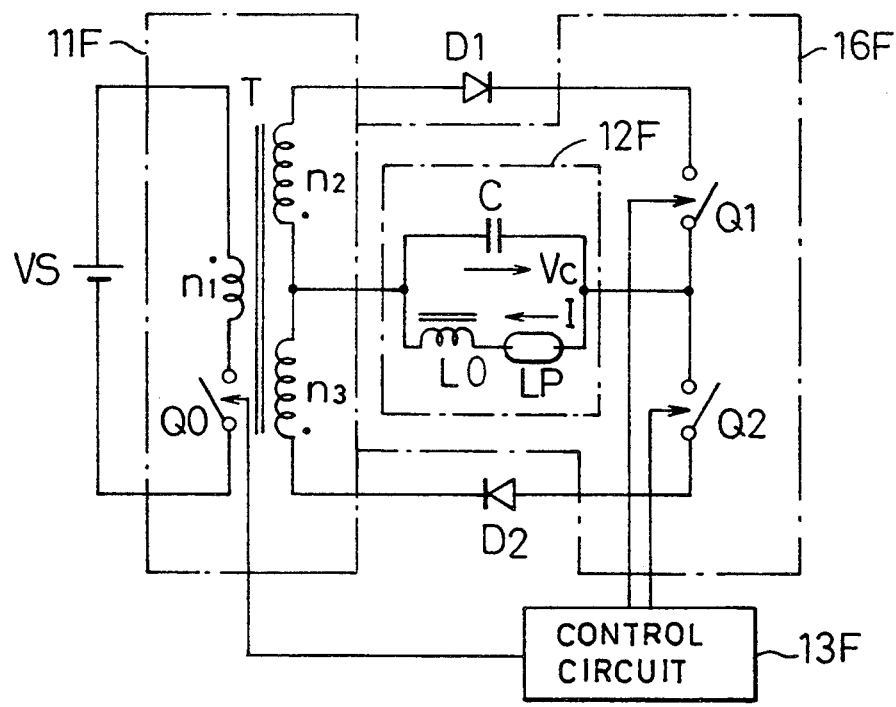

In FIG. 10, there is shown still another embodiment of the present invention, in which a series circuit of the primary winding n1 of the transformer T and the switching element Q0 is connected to the DC voltage source VS, while the secondary winding of this transformer T is divided into two n2 and n3 which are made to be mutually reverse polarities at their mutually connected side winding ends, and the inverter circuit 16F is connected through the diode D1 to the secondary windings n2 and n3. At junction point between the mutually reverse polarized ends, further, the secondary windings n2 and n3 are connected to the load circuit 12F, in which a load LP is connected in series to the inductor L0, and the capacitor C is connected in parallel to a series circuit of the load LP and inductor L0. In this case, the switching element Q0 connected to the primary winding n1 of the transformer T should preferably be one which performs the switching operation at a high frequency of several kHz to several hundred kHz, so that a voltage boosting and dropping chopper operation can be performed. On the other hand, the switching elements Q1 and Q2 connected to the secondary winding n2 should be ones which perform the switching operation at a low frequency of about several Hz to several hundred Hz, accompanying which switching operation at the low frequency can be properly changed over in the polarity of the voltage supplied to the load circuit 12F.

Figure 11:
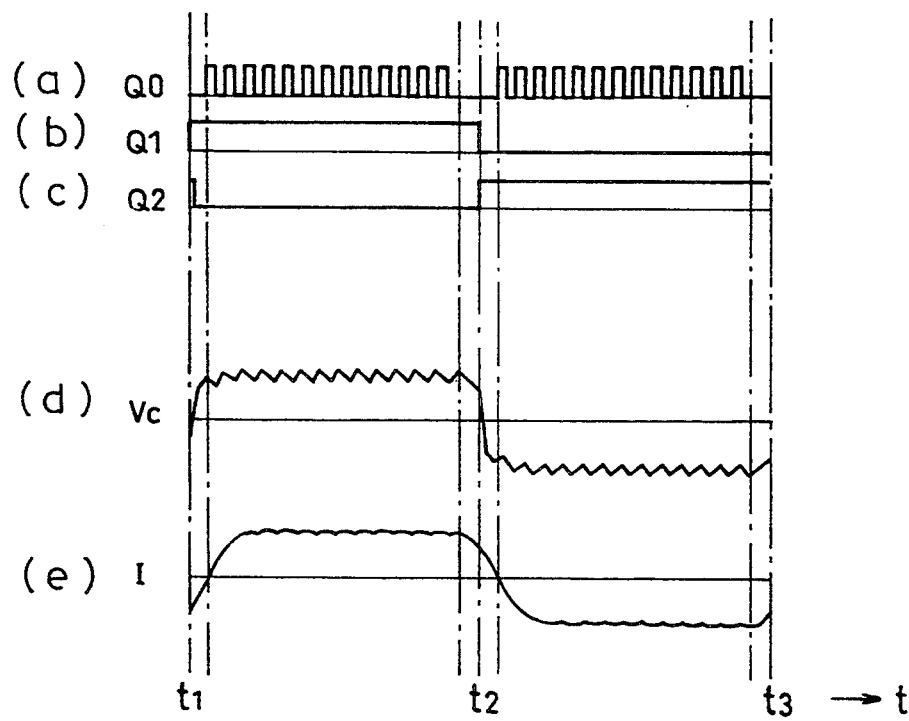
FIG. 11 shows wave-forms (a) to (e) at respective parts in the circuit of FIG. 10.

Referring specifically to the operation of the present embodiment, further, the current is made to flow through a path of the DC voltage source VS, primary winding n1 of the transformer T, switching element Q0 and again to the source VS so long as the switching element Q0 is turned ON in the period of t1–t2, and an energy responsive to a peak current value immediately before the turning OFF of the switching element Q0 is accumulated in the primary winding n1. As the switching element Q0 turns OFF, next, the energy accumulated in the primary winding n1 of the transformer T is supplied from one n2 of the secondary windings electromagnetically coupled to the primary winding n1, through a path of the diode D1, one Q1 of the switching elements connected in series in the inverter circuit 16F, load circuit 12F and secondary winding n2, to the capacitor C to charge the same. Here, the capacitor C generates the voltage $V_c$ in the direction shown by an arrow in FIG. 10, and a current I is caused to flow through the load LP in the direction shown by an arrow in the drawing. In the next period of t2–t3, the current I is caused to flow from the other secondary winding n3, through the load circuit 12F, the other switching element Q2 in the inverter circuit 16F, diode D2 and the other secondary winding n3, so that such AC current as shown in FIG. 11(e) will be supplied to the load LP.

According to the present embodiment, therefore, it is made possible to positively increase the ripple component in the voltage $V_c$ upon starting the load LP. Incidentally, while the switching elements Q1 and Q2 have been referred to in the above to be turned ON simultaneously with the polarity inversion of the current to the load circuit 12F, they may be operated to simultaneously turn OFF.

Figure 12:
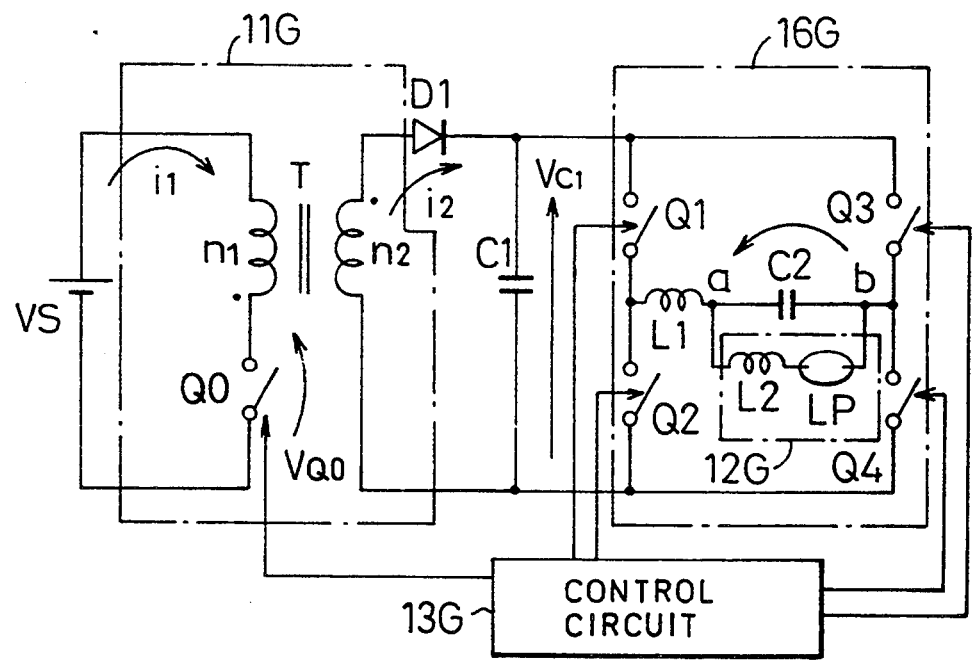
FIG. 12 is a circuit diagram of another embodiment of the present invention.

In FIG. 12, there is shown a further embodiment of the present invention, in which such discharge lamp as a metal-halide lamp or the like is employed as the load LP in the load circuit 12G connected to the inverter circuit 16G in the full-bridge type, and an inductor L2 is connected in series with the load LP. At this time, it is preferable to employ, as the inductor L2, a secondary side of a pulse transformer as an ignitor for starting the lamp, for example. Further, another capacitor C2 than the capacitance element is connected in parallel to a series circuit of the load LP and inductor L2, so that a pulse voltage provided by the ignitor upon starting the load LP by the capacitor C2 can be bypassed.

This bypassing capacitor C2 may be of a capacity considerably smaller than that of the capacitor C1 connected as the capacitance element to the output side of the voltage converting means 11G, so that, when the capacitor C1 has a capacity of several tenth $\mu$F, the capacitor C2 may be of a capacity about several hundredth $\mu$F.

Further, an inductor L1 is connected in series to the parallel circuit of the capacitor C2 with the series circuit of the load LP and inductor L2, and this inductor L1 can fill the role of preventing the capacitors C1 and C2 from being short-circuited upon the polarity inversion of the switching elements Q1, Q4 and Q3, Q2 of the inverter means 16G, while being capable of functioning also as a filter, reducing the ripple component in the current flowing through the switching elements Q1 through Q4, reducing the switching loss at these switching elements Q1 through Q4, and further reducing effectively the high frequency ripple component in the current to the load. It should be appreciated that, in the remarkable presence of the ripple component in the current to the load, there arises such unstable state in the discharge lamp, the state being regarded as an acoustic resonance phenomenon of the discharge lamp as the load.

Figure 13:
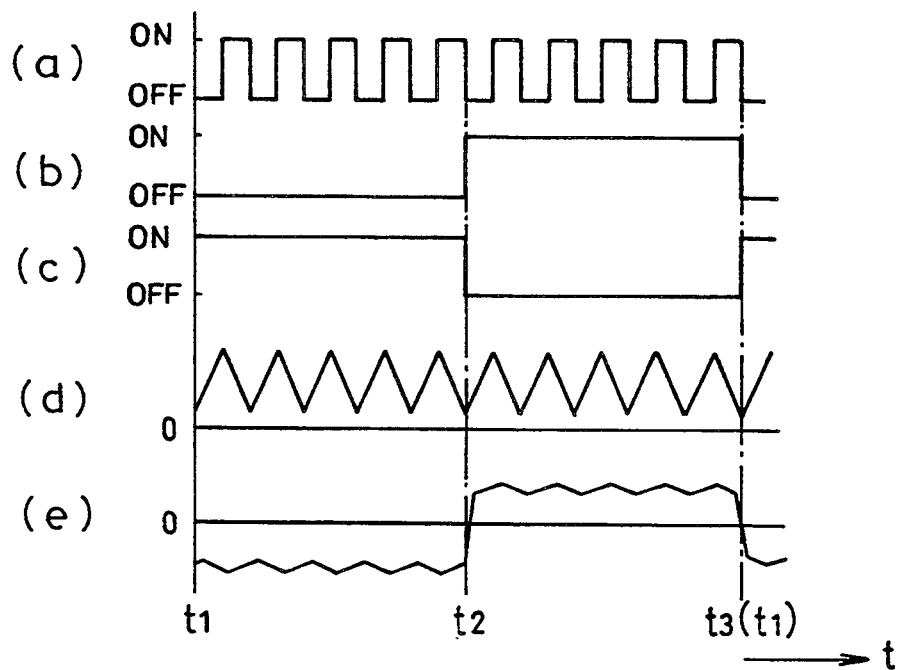
FIG. 13 shows wave-forms (a) to (e) at respective parts in the circuit of FIG. 12.

Referring to the operation of the present embodiment with reference to FIG. 13, the switching element Q0 is made to perform the switching operation at the high frequency as in FIG. 13(a) when the switching elements Q2 and Q3 are turned ON as in FIG. 13(c) but the switching elements Q1 and Q4 are turned OFF as in FIG. 13(b) in the period t1–t2, and an energy supply from the DC voltage source VS through the transformer T to the capacitor C1 is thereby performed. When in this case the capacity of the capacitor C1 is made smaller than that of any conventional device, the voltage $V_{c1}$ is made positively such pulsating current as in FIG. 13(d). Next, at the time t2, the ON state of the switching elements Q2 and Q3 shifts to the ON state of the switching elements Q1 and Q4, and the polarity inversion is performed. In the period t2–t3, the switching element Q0 performs the switching operation at the high frequency similarly to the period t1–t2, and the energy is supplied from the DC voltage source VS. At the time t3, next, the ON state of the switching elements Q1 and Q4 shifts to the ON state of the switching elements Q2 and Q3, and the polarity inversion is performed.

With the foregoing operation repeated, there is generated in the capacitor C1 such voltage $V_{c1}$ substantially rectangular shaped as in FIG. 13(e), a current with any high frequency ripple component removed is supplied through the inductor L2 to the discharged lamp LP, and this discharge lamp LP is stably lighted.

In the present case, in order that such discharge lamp LP as the metal halide lamp or the like attains a rapid rise of the light flux upon starting the lamp, it is required that a power more than a rated power of the discharge lamp LP is supplied to the lamp, and it is preferable that the arrangement is so made that, in the case where the discharge lamp is of a rated power of 35W, for example, a power of about 75W at the maximum will be supplied to the lamp upon the starting.

Further, in lighting the discharge lamp LP with the rated power after the start and stabilization of the lamp lighted, the voltage $V_c$ is made to have less pulsation component in order that the high frequency ripple component is reduced from the discharge lamp current, and the switching frequency of the switching element Q0 at the time of starting the lamp requiring a relatively great deal of power is made lower than that in the steady state, so that the expected function of the present invention can be thereby attained. Here, the voltage $V_{c1}$ of the capacitor C1 has been referred to as being substantially of a rectangular wave, but the same can be in an aspect of substantially sinusoidal wave.

Figure 14:
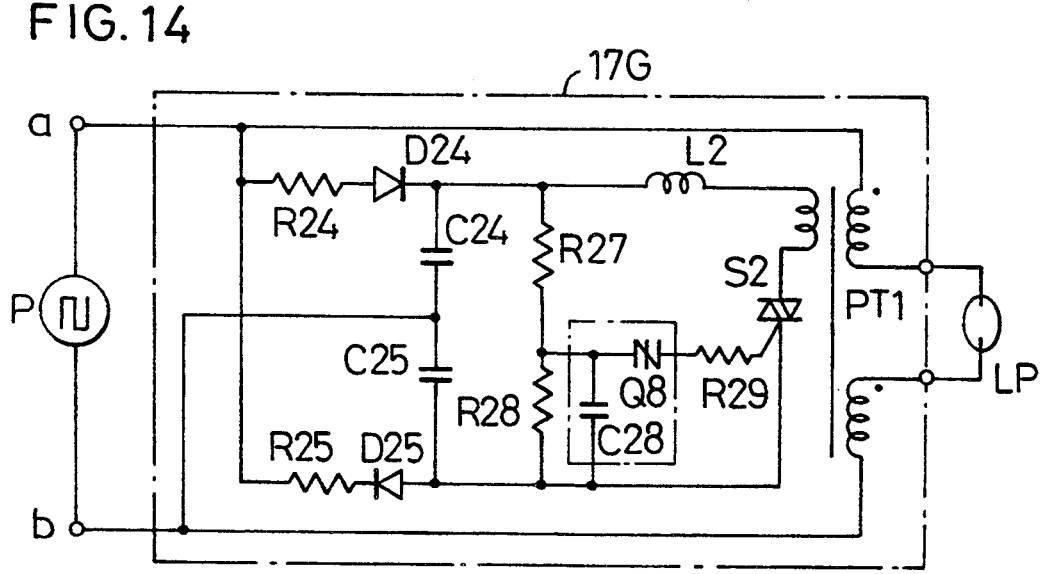
FIG. 14 is a circuit diagram showing in a working aspect a starting means employable in the embodiment of FIG. 12.

In FIG. 14, there is shown in an aspect an ignitor for starting the discharge lamp employable in the embodiment of FIG. 12. This ignitor is arranged for generating a high voltage with a voltage doubler rectifier. That is, a series circuit in which a diode D24 is connected at one end to a resistor R24 and at the other end to a capacitor C24 and a series circuit in which a diode D25 is connected at one end to a resistor R25 and at the other end to a capacitor C25 are connected in parallel with each other, a junction point between these resistors R24 and R25 as well as a junction point between these capacitors C24 and C25 are connected to both ends of a power source P, and a series circuit of a primary winding of a pulse transformer PT1 and a switching element S2 is connected to both ends of a series circuit formed by the capacitors C24 and C25. Across the power source P, a series circuit of secondary windings of the pulse transformer PT1 and the discharge lamp LP is connected. For the power source P, here, output ends of the inverter means 16G in the embodiment of FIG. 12 for supplying the AC power are employed.

With this arrangement, the capacitors C24 and C25 are charged respectively in every half cycle of the voltage wave-form of the power source P and, when the switching element S2 is made to be turned ON upon completion of the charge of the capacitors C24 and C25, a terminal voltage of the capacitors C24 and C25 is added and applied to the primary winding of the pulse transformer PT1. That is, it is made possible to apply to the primary winding of the pulse transformer PT1 the voltage about twice as large as the voltage of the power source, and a high voltage pulse can be generated from the ignitor 17G, whereby it is made possible to generate the high voltage pulse at every half cycle of the source voltage. At this time, the high voltage pulse is made to have a single polarity irrespective of the voltage polarity of the power source P, and a direction in which the high voltage pulse is applied is determined in view of the relationship to a breakdown voltage. For the switching element S2, a thyristor, TRIAC or the like, for example, may be employed. It will be also possible to connect a plurality of the switching elements mutually in parallel to increase the current capacity. Further, a spark gap capable of self-triggering may also be employed.

Figure 15:
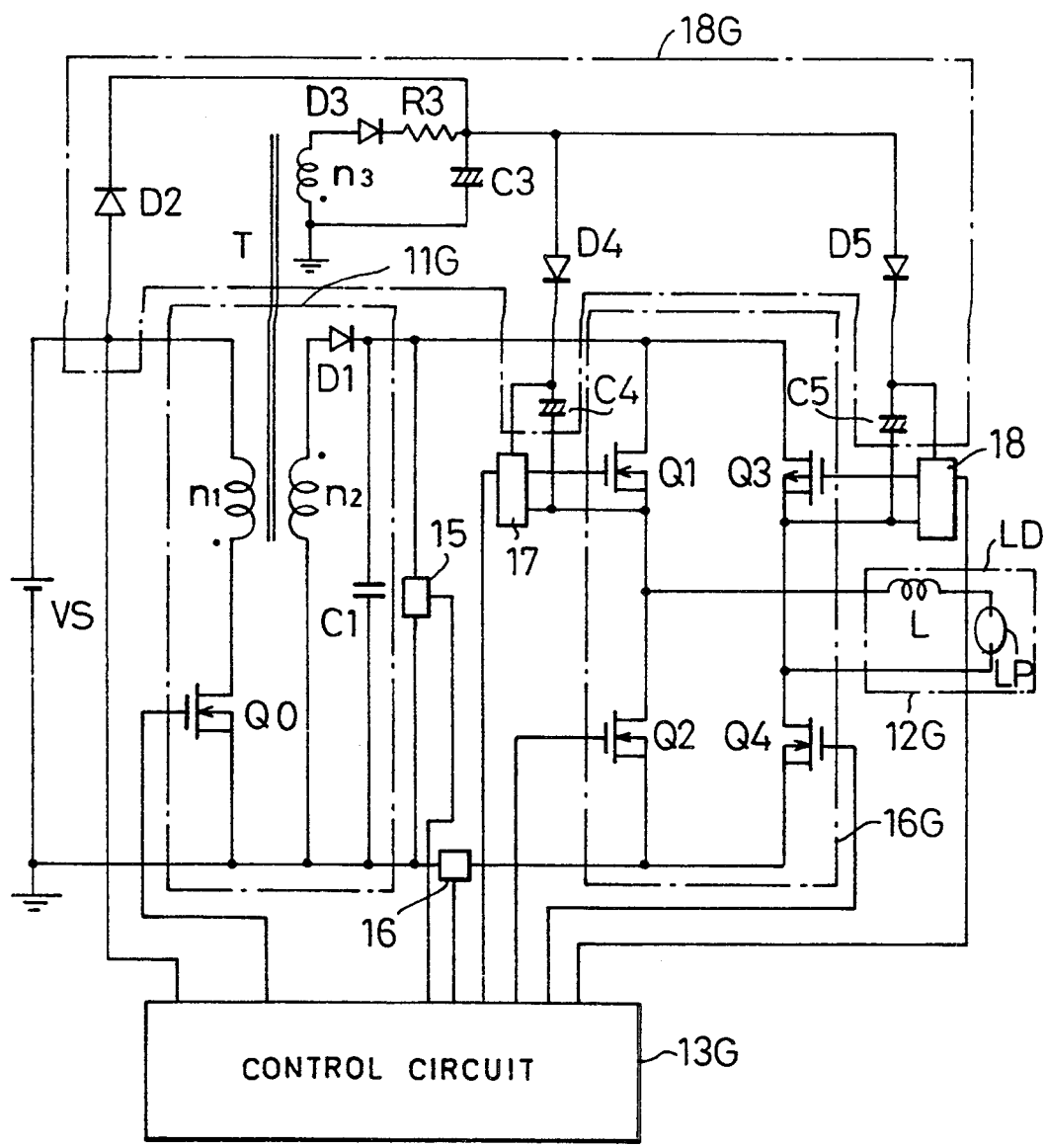
FIG. 15 is a circuit diagram showing in a working aspect a voltage converting means in the embodiment of FIG. 12.

In FIG. 15, a concrete working aspect of the device according to the present invention and employable in the embodiment of FIG. 12 is shown, which comprises basically the voltage converting means 11G, load circuit 12G, control circuit 13G, inverter means 16G and driving voltage source means 18G, and additionally a voltage detecting means 15, current detecting means 16 and driving means 17 and 18. With this arrangement, in particular, the predetermined power is supplied to the load circuit 12G on the basis of the detection signals from the voltage detecting means 15 and current detecting means 16, the switching operation of the switching element Q0 is executed and the inverter means 16G in the full-bridge type is driven. Since in this case transistors forming the switching elements Q1 and Q3 on higher potential side in the inverter means 16G are different in the ground potential, their driving requires individual driving means 17 and 18. Here, capacitors C4 and C5 acting respectively as a voltage source are connected to the driving means 17 and 18, and these capacitors C4 and C5 are charged through diodes D2, D4 and D5 by the DC voltage source VS upon starting the load circuit 12G. Further, after the starting of the load circuit 12G, the capacitors C4 and C5 are substantially charged to the voltage occurred in a capacitor C3 even when the source voltage has dropped at such moment as valleys in the pulsating voltage wave-form, and the predetermined source voltage is stably supplied to the driving means 17 and 18.

In the working aspect shown in FIG. 15, the arrangement is so made that, when the discharge lamp LP in the load circuit 12G is of the rated power of, for example, about 35 W and the source voltage of the DC voltage source VS is about 12.8 V, the turn ratio of the transformer T is about n1:n2=1:7, the switching element Q0 is a power MOSFET of a threshold voltage of about 100 V, the capacitor C1 is of the capacity of about 0.56 to 1.0 $\mu F$, the switching elements Q1 to Q4 are power MOSFETs of the threshold voltage of about 400 to 500 V, and the switching frequency of the elements is about 30 to 70 kHz for the primary side of the transformer T and about 40 to 1000 Hz for the secondary side. In the aspect shown here, the switching element Q0 is single, but it is also possible to employ two or more as connected in parallel in order to lower the ON resistance. Further, the additional capacitor C3 for use as the auxiliary power source may also be utilized as other voltage source for driving the switching elements Q0, Q2 and Q4 than the driving means 17 and 18.

Figure 16:
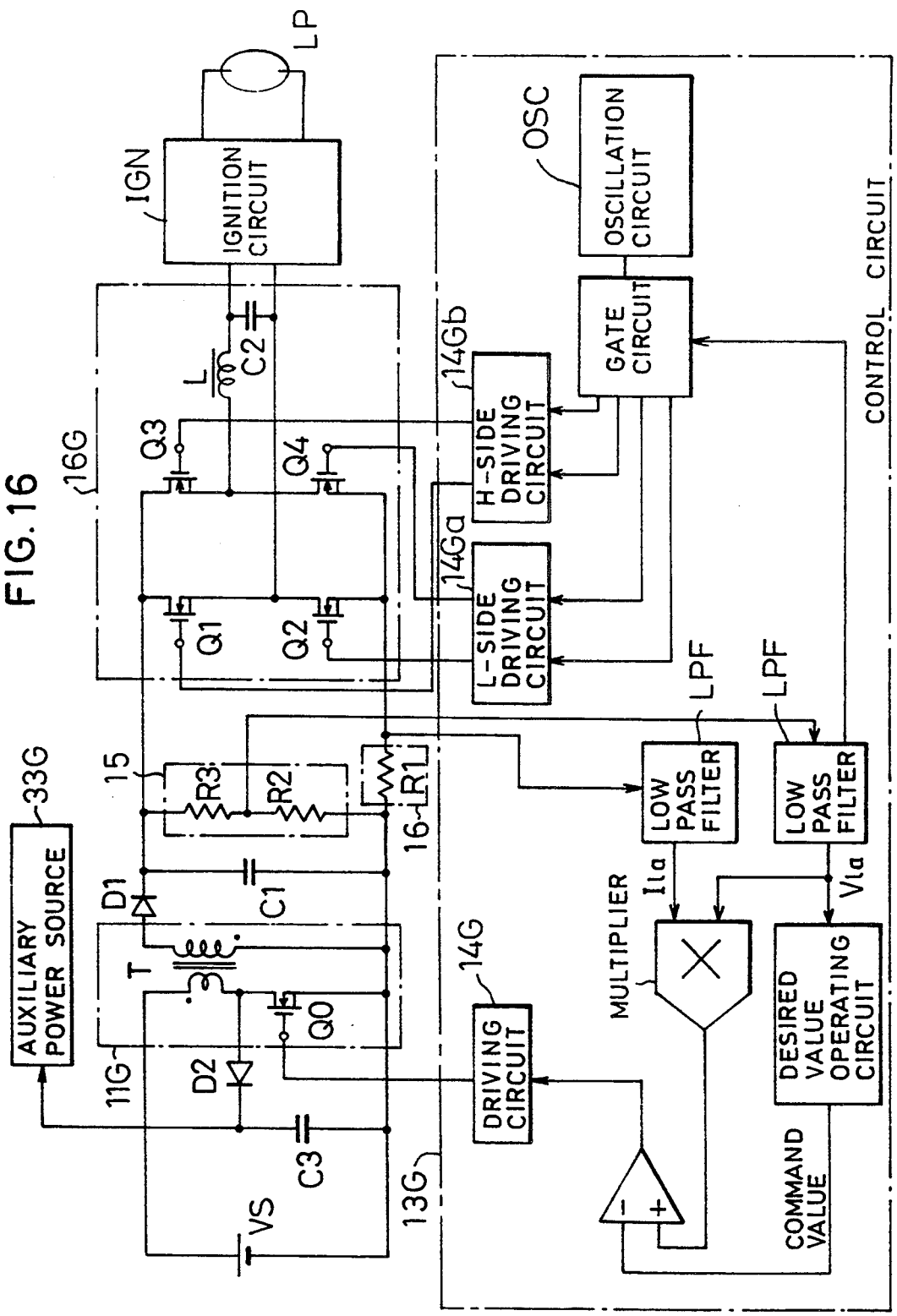
FIG. 16 is a detailed circuit diagram of one of the optimum working aspects of the embodiment shown in FIG. 12.

For the control circuit 13G employed in the working aspect of FIG. 15, such one as shown in FIG. 16 can be employed, in which the output voltage and current of the DC/DC converter means 11G are detected by the voltage and current detecting means 15 and 16, the control circuit 13G receives the output signals of both detecting means 15 and 16, which signals are subjected to the deletion of the high frequency ripple component through a low pass filter and to an operation at a multiplier, and the net power value is obtained. This net power value is compared with a target command value obtained through a target operating circuit for setting the output in accordance with the output signal of the voltage detecting means 15, and the ON period of the switching element Q0 is so controlled as to render any difference made known through the comparison to be zero. At this time, upon starting the load circuit, the switching frequency f of the DC/DC converter, ON time Ton, turn ratio of the transformer and the capacity of the capacitor $C_1$ are optimumly set for rendering the timing of turning OFF the switching element Q0 of the DC/DC converter 11G to be close to zero of the voltage $V_c$.

At the inverter means 16G, next, the switching operation of the switching elements Q1, Q4 and Q2, Q3 in pairs is changed over alternately, so that the output voltage of the inverter means will be converted in the polarity. Here, the switching frequency of the elements is made to be such relatively low frequency as about several ten Hz to several hundred Hz. In order to improve the startability, further, the frequency of alternating polarity is set to be the direct current or about several ten Hz immediately after the starting at which the discharge lamp is unstable, and thereafter the frequency is raised to be about several hundred Hz to have any flicker restrained at the time of the polarity inversion.

Further, in an event where the metal halide lamp is employed as a light source for automobiles use head lamp, it is required to quicken the rise of the luminous flux of cold starting, and a control is realized such that the power several times as much as the rated power is supplied for a predetermined period even when the load voltage immediately after the starting is low, to have the gas vapor pressure in the lamp quickly elevated to raise the luminous efficiency, and to quickly stabilize the luminous flux.

Figure 17:
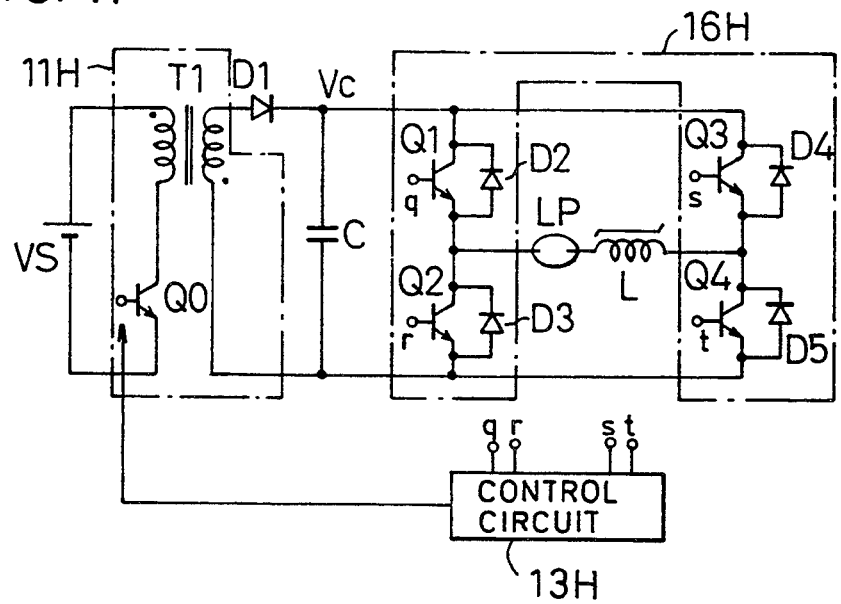
FIG. 17 shows in a circuit diagram still another embodiment of the present invention.

In another embodiment shown in FIG. 17, there is taken a measure for effectively restraining the voltage rise due to the resonance. Now, in an event where such discharge lamp as the metal halide lamp or the like is employed as the load, as in the foregoing embodiment of FIG. 12, the impedance immediately after the starting is lower than that in the state of stable lighting, when the ambient temperature is sufficiently low. At this time, it is desired to have the rise of the luminous flux quickly executed, and a relatively large current is made to flow, to render the current in the load circuit to be also large. Thus, in the present embodiment, the DC/DC converter constituting the voltage converting means 11H includes a voltage boosting and dropping chopper circuit, in which the ON period of the switching element Q0 operating at the high frequency is subjected to a PWM control to have the output voltage controlled. A smoothing capacitor C smooths the output of the voltage boosting and dropping chopper circuit, and supplies the DC voltage $V_c$ to the inverter means 16H. To the load LP, further, such saturable inductor L as a pulse transformer is connected in series, and this saturable inductor L is made to be in a magnetic saturation at the time when the load current of a value more than a predetermined value, for example, two or three times as much as the rated current upon the starting of the load LP.

Figure 18:
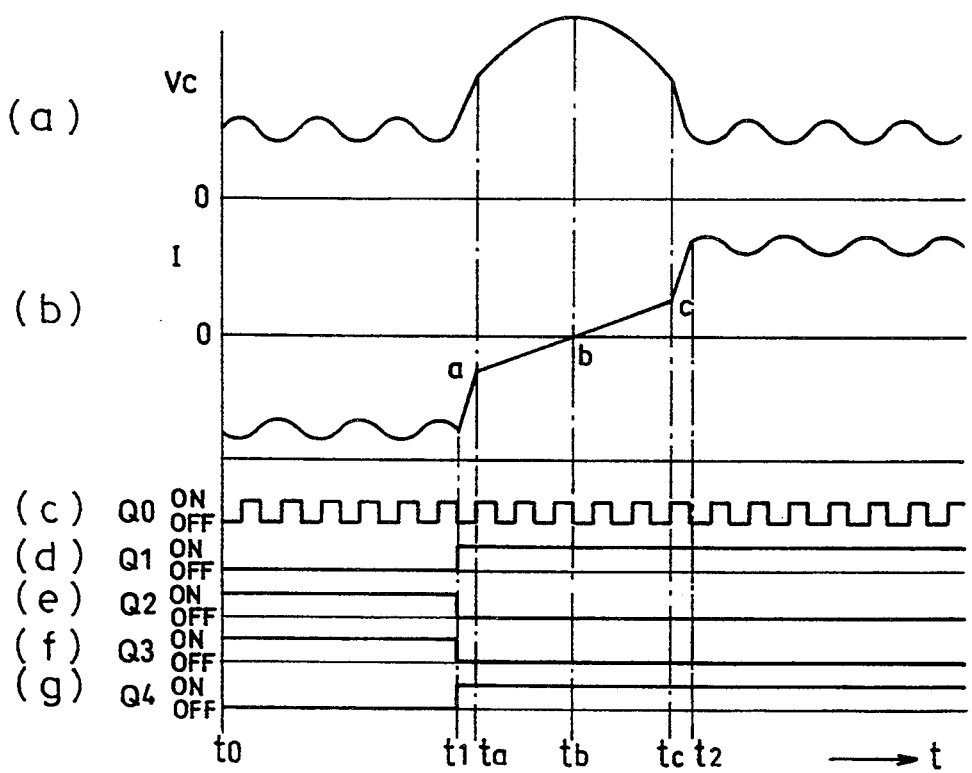
FIG. 18 shows wave-forms (a) to (g) at respective parts in the circuit of FIG. 17.

Referring more specifically to the above with reference also to FIG. 18, the saturable inductor L is in the saturated state in a period of t1–ta, and the inductor L is made to have a small inductance value. In this state, the polarity of the switching elements Q1–Q4 in the inverter means 16H is inverted, and the inductor L is made to be in a non-saturated state at a certain current value at the time ta, as the load current I to the load circuit decreases. Next, as the load current is inverted in the polarity and reaches a value above the predetermined current value, then the inductor L is saturated again, and the load current becomes abrupt in the gradient and rises to the predetermined current value in a period tc–t2. According to the present embodiment, therefore, the rise in the resonance voltage $V_c$ due to the inductor L and capacitor C upon the starting can be restrained by utilizing the saturability of the inductor L, the restraint of the resonance voltage $V_c$ by means of the voltage boosting and dropping chopper circuit requires no specific circuit, and the simplification of the entire circuit can be realized. Further, it is made possible to flow the forced current sufficiently for the purpose of shifting the load LP to an arc discharge immediately after the starting.

Figure 19A:
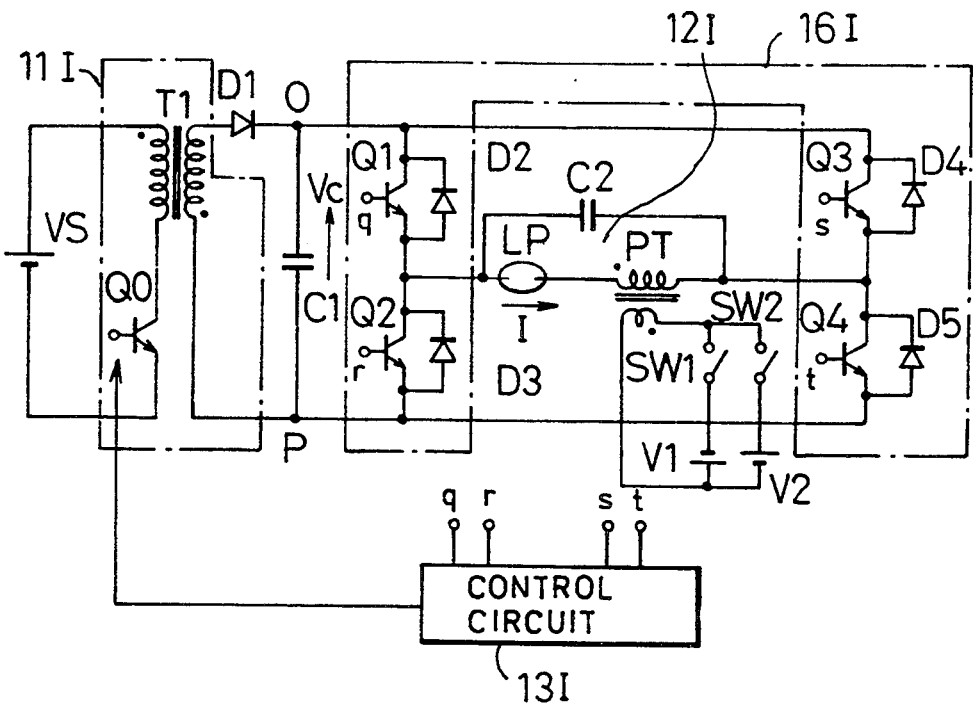
FIG. 19A shows in a circuit diagram another embodiment of the present invention.

In such another embodiment according to the present invention as shown in FIG. 19A, a tertiary winding of the pulse transformer PT in the load circuit 12I is connected through a switch SW1 to a DC voltage source V1 and also through another switch SW2 to another DC voltage source V2 of a polarity opposite to the source V1. When the load current I is flowing through the load LP in a direction shown by an arrow in the drawing, here, the inductance value on the secondary side of the pulse transformer PT is caused to reduce by a current made to flow to the primary side of the pulse transformer PT with the switch SW1 closed to be ON. When, on the other hand, the load current I is reverse to that shown, the switch SW2 is made ON and the inductance value on the secondary side of the pulse transformer PT is reduced. In this case, the inductance on the secondary side of the pulse transformer PT is reduced by making the switch SW1 or SW2 ON for a fixed period immediately before the polarity inversion of the output of the inverter means 16I upon the starting the load and in accordance with the direction in which the load current flows, and any rise in the voltage $V_{c1}$ due to the resonance of the capacitor C1 and inductor can be restrained.

Figure 19B:
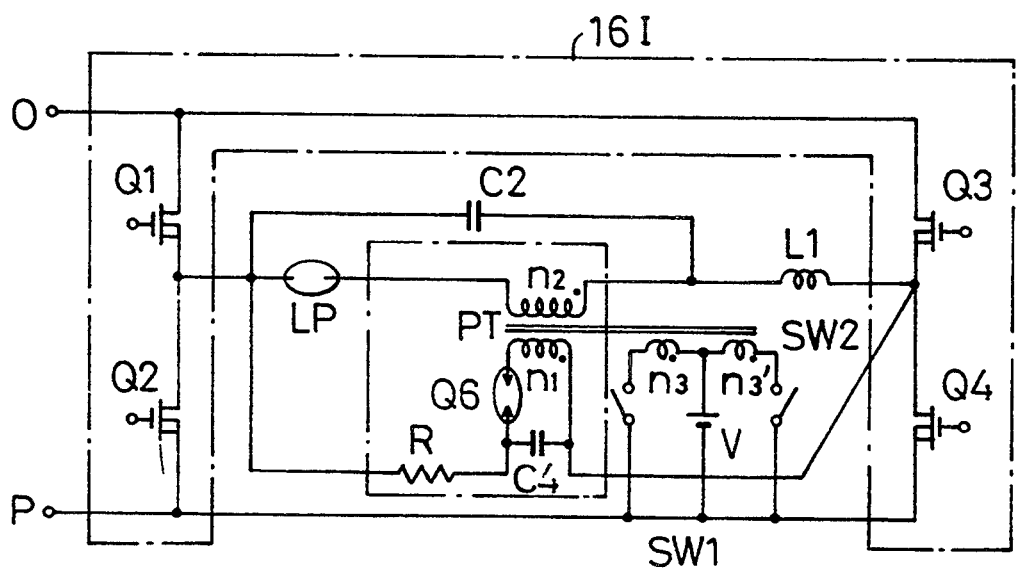
FIG. 19B is a circuit diagram showing in a working aspect a starting means employable in the circuit of FIG. 19A.

In the embodiment shown in FIG. 19A, peripheral region of the pulse transformer PT should preferably be arranged more concretely as shown in FIG. 19B. That is, on the side of the primary winding n1 of the pulse transformer PT, there are connected an energy accumulating capacitor C4 and such switching element Q6 as TRIAC or discharging gap, for a smooth pulse generation, and the charge to the capacitor C4 is carried out through a resistor R. To the tertiary windings n3 and n3' of the pulse transformer PT, the switches SW1 and SW2 and DC voltage sources V1 and V2 are respectively connected.

Figure 20:
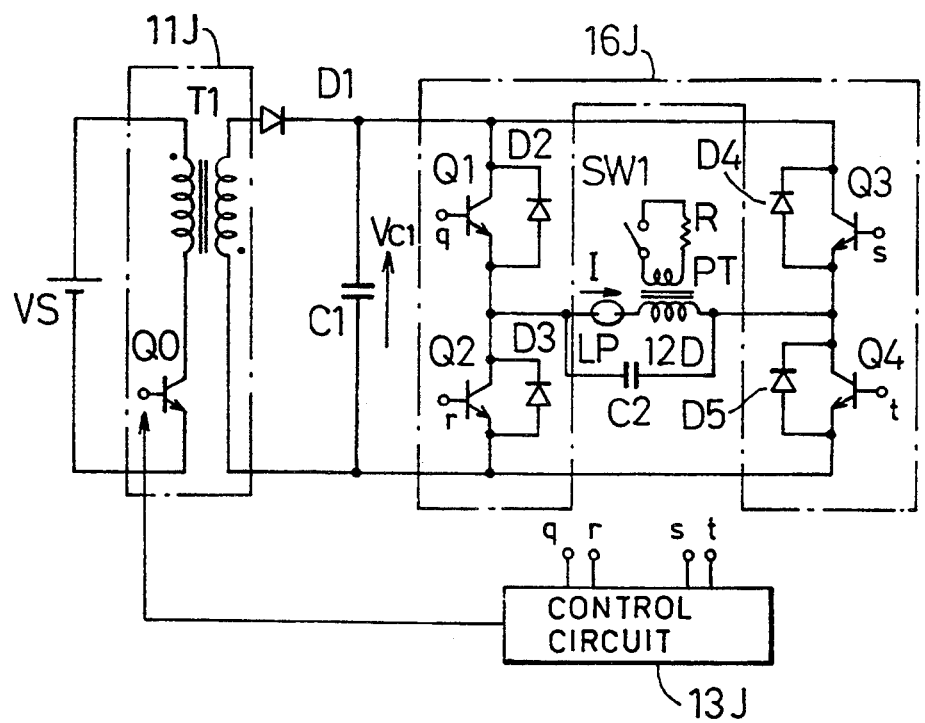
FIGS. 20 to 24 are circuit diagrams showing still further embodiments of the device according to the present invention.

In a further embodiment of the present invention as shown in FIG. 20, there is formed a closed loop circuit which connects a secondary winding of the pulse transformer PT through the switch SW1 to the resistor R. In this case, the switch SW1 is turned ON from immediately before the polarity inversion of the output of the inverter means 16J upon starting the load LP, and the resonance of the inductor and capacitor C1 on the secondary side of the pulse transformer PT can be substantially absorbed by the resistor R at the time of the polarity inversion of the output of the inverter means.

Figure 21:
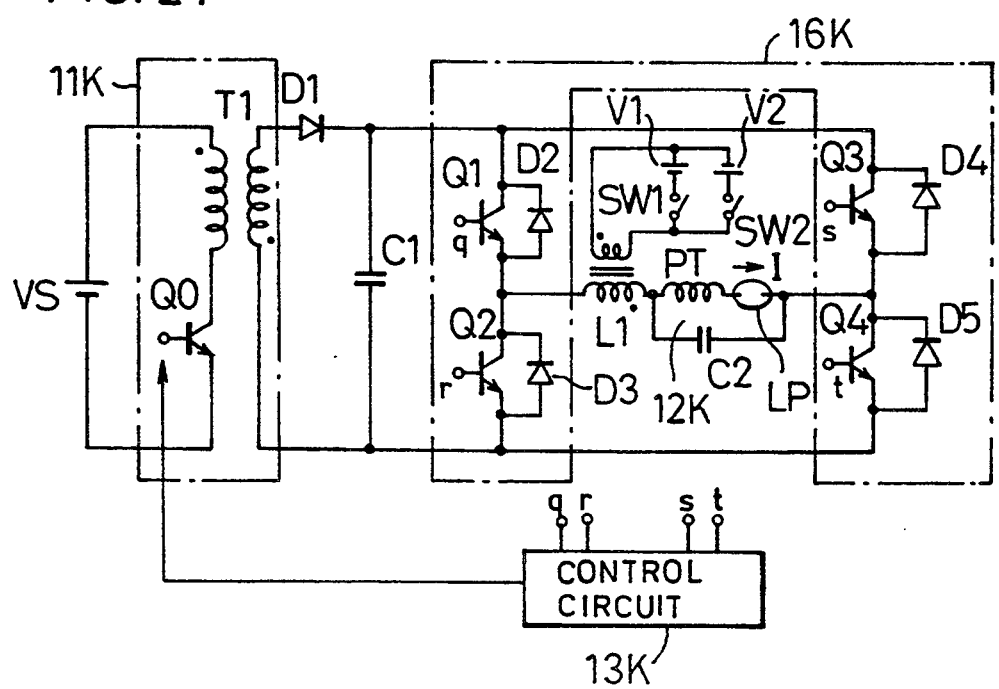

In another embodiment of the present invention as shown in FIG. 21, in contrast to the foregoing embodiment of FIG. 7, a secondary winding L1 of another transformer is connected in series to the secondary winding of the pulse transformer PT. In the present instance, it is avoided to cause the pulse transformer PT to be complicated by providing a tertiary winding to the pulse transformer PT.

Figure 22:
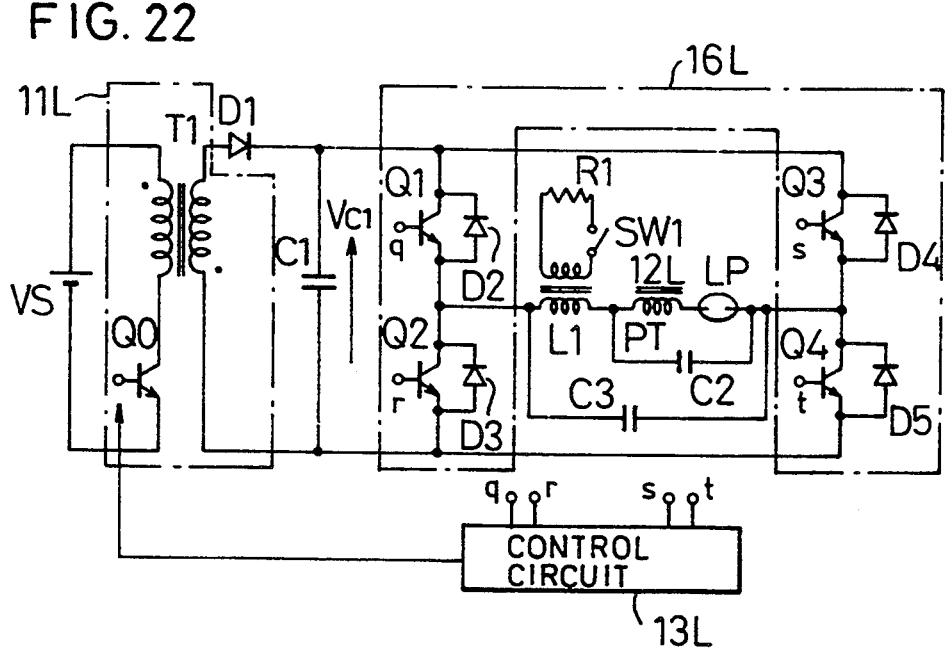

In another embodiment shown in FIG. 22 of the present invention, in contrast to the embodiment of FIG. 8, a secondary winding of another transformer T is connected in series to the pulse transformer PT, whereby the switch SW1 is made ON for a fixed period from immediately before the polarity inversion in the output of the inverter means 16L upon the starting, and the insertion of the resistor R1 in the primary winding of another transformer T allows the resonance energy occurring in particular upon the polarity inversion to be absorbed.

Figure 23:
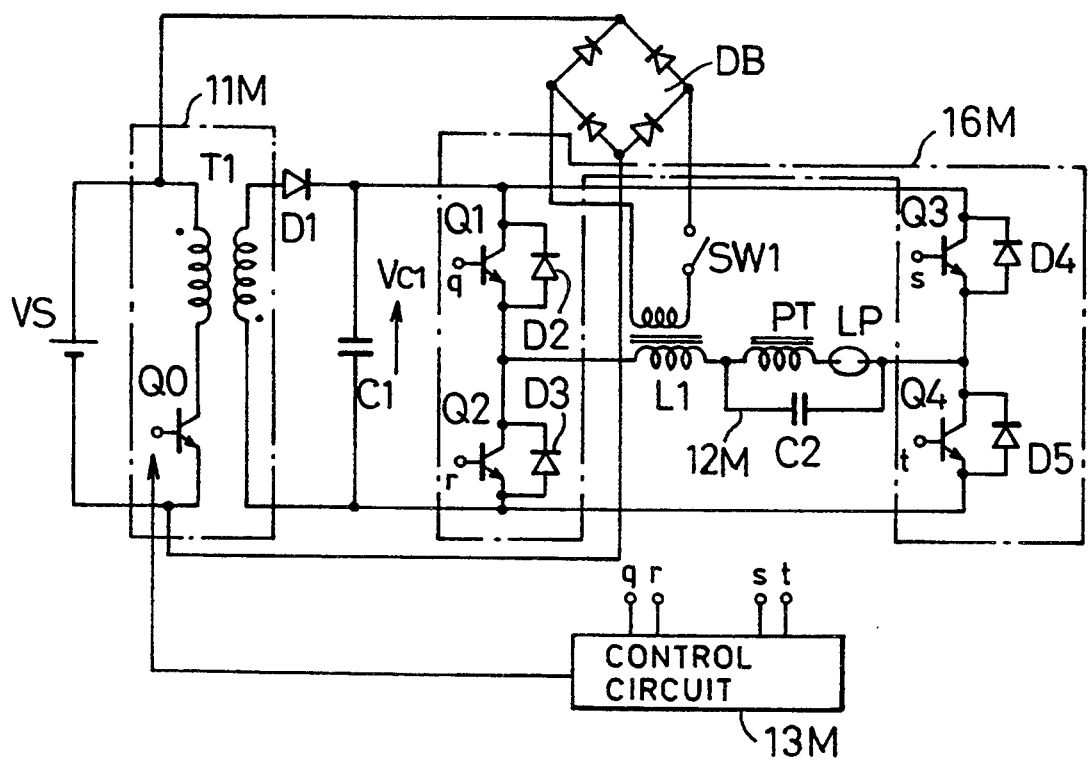

In another embodiment of the present invention as shown in FIG. 23, in contrast to the embodiment of FIG. 9, in particular, a secondary winding L1 of another transformer is connected in series to the secondary winding of the pulse transformer PT. In the present instance, the resonance energy occurring on the secondary side of the transformer through the inductance element L1 can be made to feedback through a rectifying circuit of diode bridge DB to the side of the DC voltage source VS, by making the switch SW1 to be ON for a fixed period from immediately before the polarity inversion of the output of the inverter means 16M upon the starting of the load.

Figure 24:
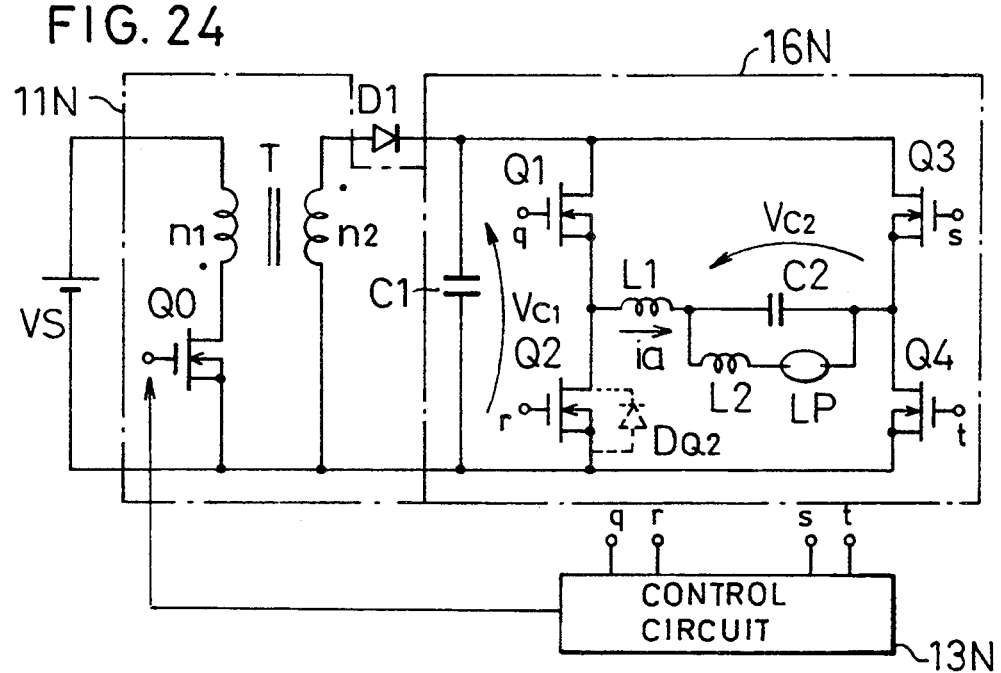

In another embodiment of the present invention as shown in FIG. 24, substantially the same arrangement as the more concrete aspect shown in FIG. 15 of the embodiment of FIG. 12 is employed but, in the present instance, the voltages $V_{c1}$ and $V_{c2}$ at the capacitors C1 and C2 show mutually reverse polarity at the time when the switching elements Q1 and Q4 are turned ON, in particular, and an excessive and abrupt current is to flow through a path of the capacitor C1, switching element Q4, capacitor C2, inductor L1 and switching element Q1, so that there can be provided a measure for overcoming problems confronted when the minimization of size is intended such that the excessive and abrupt current requires to employ a switching element of a large capacity or an inductor of a large inductance value for the purpose of restraining the current.

Figure 25:
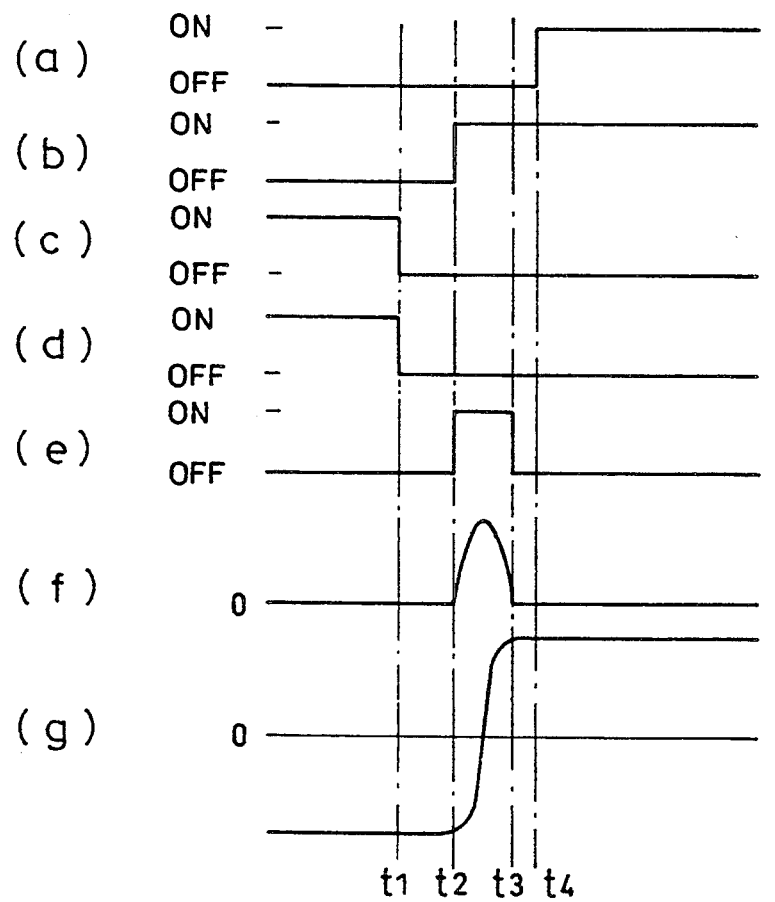
FIG. 25 shows wave-forms (a) to (g) at respective parts in the circuit of FIG. 24.

Referring more specifically to the above also with reference to wave-forms (a) through (g) of FIG. 25, the FETs Q3 and Q2 which have been ON are turned OFF at the time t1 as shown in (c) and (d), first, and there is provided a dead time in which all FETs Q1–Q4 are OFF, upon which almost none of the current ia flows as in (f) prior to the start of the load LP, and the voltage $V_{c1}$ at the capacitor C1 maintains a fixed potential of several hundred volts. At the time t2, next, the FET Q4 is turned ON as in (b), the charge accumulated in the capacitor C1 in a period t2–t3 is made to flow as the current I through a path of the capacitor C1, MOSFET Q4, parasitic diode $D_{Q2}$ of MOSFET Q2, inductance element L1 and capacitor C1 and in accordance with the resonance between the capacitor C1 and the inductance element L1, and the parasitic diode $D_{Q2}$, for example, is driven as in (e) for a period of one half of resonance cycle of the capacitor C1 and inductance element L1. As next time t3 is reached and the current ia no more flows, the voltage $V_{c4}$ takes a value of a polarity reverse to the original and substantially the same potential as shown in (g). When the MOSFET Q1 is turned ON at next time t4 as in (a) the voltage $V_{c1}$ showing the polarity reverse to the original causes no excessive current to flow. Since the MOSFETs Q1 through Q4 are thus controlled to effectively prevent the excessive and abrupt current as well as eventual surge voltage from occurring upon the polarity inversion, and are also effective to simplification of the circuit without causing it to be complicated, it is possible to attain the minimization in size of the power source device.

Figure 26:
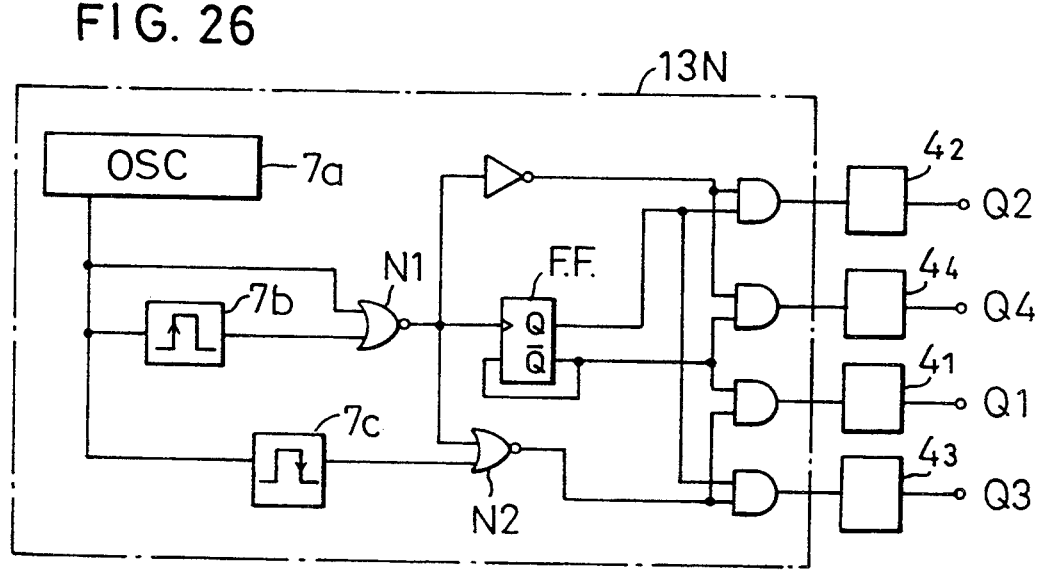
FIG. 26 shows in a circuit diagram a working aspect of a control means with respect to a switching means employable in the circuit of FIG. 24.

An aspect of the inverter means 16N employable in the embodiment of FIG. 24 is shown in FIG. 26, in which an oscillation signal of an oscillator 7a and an output of one-shot multivibrator 7b triggered by a rise of the oscillation signal from the oscillator 7a are input to NOR gate N1 which obtains NOR. An AND output of a Q output of a flip-flop F.F. triggered by an output signal of the NOR gate N1 and of an inverted signal of the output signal of the NOR gate N1, as well as an AND output of the inverted signal of the output signal of the NOR gate N1 and of an inverted Q output of the flip-flop F.F., are provided respectively through each of drive circuits $4_2$ and $4_4$ as trigger signals for the MOSFETs Q2 and Q4. Further, an AND output of an output signal of NOR gate N2 for NOR of an output of one-shot multivibrator 7c triggered by a fall of the oscillation signal from the oscillator 7a and the output signal of the NOR gate N1, and of the Q output of the flip-flop F.F., as well as another AND of an output signal of the NOR gate N2 and inverted Q output of the flip-flop F.F. are provided respectively through each of further drive circuits $4_1$ and $4_3$ as trigger signals for the MOSFETs Q1 and Q3. With this arrangement, the respective MOSFETs are enabled to quickly and highly precisely perform the switching operation, and the switching operation loss can be minimized.

In the respective foregoing embodiments of FIGS. 4, 5, 7, 8, 9, 10, 12, 17, 19, 20, 21, 22, 23 and 24, all other arrangements than those described are the same as those in the foregoing embodiment of FIGS. 1 and 2, main constituents in the respective embodiments are denoted by the same reference numbers as those used in FIGS. 1 and 2 but respectively with each of alphabets A–N added, substantially the same constituents as those described in respect of FIGS. 1 and 2 or preceding embodiment are denoted substantially by the same reference symbols, and these constituents are capable of attaining the same function and effect as those in the embodiment of FIGS. 1 and 2 or any preceding embodiment.

Further, the control of the polarity inversion in the respective foregoing embodiments can be realized in accordance with the state of the load. For example, the polarity can be properly changed over in accordance with the value of the voltage $V_c$ of the capacitor C and the arrangement may be so made as to select as occasion demands a control mode in loadless state, a control mode for stable lighting and so on for their realization.

What is claimed is:

1. A power source device for supplying a power to a load, comprising;
   a DC voltage source;
   a voltage converting means connected to said DC voltage source, said voltage converting means including a high frequency switching means for controlling said supplied power, and rendering said supplied power larger at least upon starting said load than that during a stable operation of said load;

a capacitance element connected to an output side of said voltage converting means; and a load circuit including said load and connected in parallel to said capacitance element, said load circuit having a load impedance made smaller upon said starting of said load than that during said stable operation of said load;

wherein a control means is further provided for controlling said high frequency switching means with a control constant made substantially constant at least immediately after said starting of the load and during said stable operation of the load, and turning the high frequency switching means OFF when said capacitance element is of a voltage below a predetermined value.

2. The device according to claim 1 which further comprises means for detecting a pulsating voltage at a level below a predetermined value, said pulsating voltage occurring across both ends of said capacitance element.

3. The device according to claim 1 which further comprises a rectifying element connected between said output side of said voltage converting means and said capacitance element, to be in a direction of charging the capacitance element upon turning OFF of said high frequency switching element.

4. The device according to claim 1 wherein said voltage converting means is a converter of a fly-back type including a non-insulating transformer.

5. The device according to claim 1 wherein said voltage converting means is a converter of a fly-back type including an insulating transformer.

6. The device according to claim 1 wherein said voltage converting means is a converter including a voltage boosting chopper.

7. The device according to claim 1 wherein said voltage converting means is a converter including a voltage boosting and dropping chopper.

8. The device according to claim 1 which further comprises a full-bridge type inverter means connected across said voltage converting means through a rectifying element for alternating the polarity of a voltage applied to the load circuit.

9. The device according to claim 8 wherein said capacitance means is connected in parallel to said load circuit.

10. The device according to claim 4 which further comprises a switch circuit of switches in a series connection and connected across said voltage converting means, and a rectifying element connected between the voltage converting means and said switch circuit, said load circuit being connected between a middle point of a secondary winding of said non-insulating transformer and said switch circuit.

11. The device according to claim 5 which further comprises a switch circuit of switches in a series connection and connected across said voltage converting means, and a rectifying element connected between the voltage converting means and said switch circuit, said load circuit being connected between a middle point of a secondary winding of said insulating transformer and said switch circuit.

12. The device according to claim 1 wherein said load in said load circuit is a high intensity discharge lamp.

13. The device according to claim 8 wherein said load circuit comprises a series circuit of a first inductor and a second capacitance element and a further series circuit of a second inductor and a high intensity discharge lamp forming said load connected in parallel to said second capacitance element, the arrangement being such that a charge of said second capacitance element is applicable to a closed loop formed by said first inductor, second capacitance element and a switch circuit in said inverter means, prior to a polarity inversion by said polarity alternation at said inverter means.

14. The device according to claim 13 which further comprises means for reducing the inductance value of said first and second inductors of said load circuit at least upon said polarity inversion.

15. The device according to claim 14 wherein said means for reducing the inductance value comprises a saturable inductor which saturates with a current above a predetermined current value.

16. The device according to claim 14 wherein said load circuit comprises a series circuit of a high intensity discharge lamp forming said load and a secondary side winding of a pulse transformer, and a bypass capacitor connected in parallel to said series circuit, and said means for reducing the inductance value is formed to reduce the inductance value of said secondary side winding.

17. The device according to claim 15 which further comprises means for detecting the current flowing to said load circuit, and means for applying a DC voltage to a primary side winding of said transformer in a direction of cancelling said current to the load circuit depending on a direction of said current.

18. The device according to claim 13 which further comprises means for rendering an energy accumulated in said inductors in said load circuit to be ineffective within the load circuit at least upon said polarity inversion.

19. The device according to claim 10 which further comprises means for rendering an energy accumulated in an inductor of said load circuit to be ineffective within the load circuit at least upon said polarity inversion.

20. The device according to claim 1 wherein said control means controls said high frequency switching means with one of such circuit constants as oscillation frequency and duty as said control constant made to be substantially constant immediately after said starting of the load and during said stable operation of the load circuit, and have the high frequency switching means turn OFF when the capacitance element has a voltage below a predetermined value.

* * * * *